April 10, 1934.

S. C. VAIL ET AL 1,954,435

ELECTROLYTE LEVEL INDICATOR

Filed Feb. 7, 1931

Inventors
Samuel C. Vail and
Arthur B. Cunningham
per James B. Lewis
Attorney

Patented Apr. 10, 1934

1,954,435

UNITED STATES PATENT OFFICE 1,954,435

ELECTROLYTE LEVEL INDICATOR

Samuel C. Vail, Evanston, and Arthur B. Cunningham, Chicago, Ill.

Application February 7, 1931, Serial No. 514,158

1 Claim. (Cl. 136—182)

The present invention relates to indicating devices, more particularly to a liquid level indicating device for storage batteries and comprehends means for giving an indication when the level of the electrolyte of the cell or cells of the battery falls below a predetermined minimum level beyond which it is unsafe to continue the use of the battery.

One object of the invention is to provide an electrolytic level indicator which is simple in construction, inexpensive to install, and dependable and efficient in operation.

Another object of the invention is to provide an electrical signal system which may be readily applied to batteries already in service with only slight modification of the batteries and which does not impair the efficiency of the battery.

A further object of the invention is to provide a signalling system for installation on automobiles for indicating to the operator of the automobile or other vehicle when the electrolyte in the cell or cells of the battery has been used to or beyond a predetermined low level.

A still further object of the invention is to provide a system wherein an electrode is placed in each cell of the battery and connected to a signalling device located at a convenient point remote from the battery and which is energized by the closing of the circuit between the signalling device and a pair of the electrodes.

The system further comprises a normally open circuit which may be closed at will to give an indication of the condition of the individual cells of the battery and in which no element is introduced into the cells which induces any chemical action or produces any substance which has an injurious effect upon the battery.

With these and other objects in view, the invention consists of certain novel features of construction and operation as will be more fully described and particularly pointed out in the specification, drawing, and claim appended hereto.

In the drawing, wherein like reference characters are used to designate like parts, Fig. 1 illustrates the preferred form of the invention as applied to a three cell storage battery, which is in section, with the plates removed.

While several embodiments of the invention have been illustrated, it is to be understood, however, that the invention is not limited to any particular type or any specific use as modifications and uses within the scope of the invention readily suggest themselves to those skilled in the art and it is obvious, therefore, that the invention may be utilized to indicate the condition of the electrolyte in storage batteries wherever used, regardless of the purpose for which they are used. Furthermore, the indication may be and is intended to be given at a convenient location where it may be readily observed regardless of the location of the battery itself.

Figure 1:
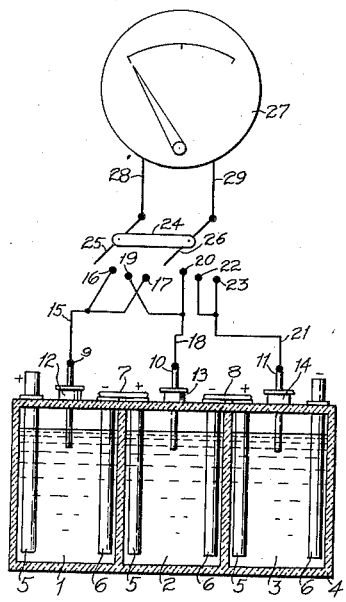

Referring to the exemplary embodiment of the invention illustrated in Fig. 1, the battery container or box 4 comprises cells 1, 2, and 3, which may be of any well known construction. Each of the cells contains the usual positive and negative plates which, for purposes of illustration, have been omitted from the drawing to more clearly illustrate the invention, the terminal of a positive plate assembly 5 and the terminal of a negative plate assembly 6. These assemblies are connected thru connectors 7 and 8 as is well known in the art. Intermediate electrodes 9, 10, and 11 project into the battery preferably, though not necessarily, thru the closure caps 12, 13, and 14 respectively. These electrodes extend into the cells a short distance below the normal level of the electrolyte, which level is indicated by the height of the liquid illustrated in the cell.

The conductor 15 connected with the electrode 9 branches into two branches which terminate in the switch contacts 16 and 17. The other conductor 18 connected with the electrode 10 also branches into two branches which terminate in the switch contacts 19 and 20. Likewise, a third conductor 21 connected with the electrode 11 also branches into two branches which terminate in the switch contacts 22 and 23. A double pole switch 24 provided with contact engaging arms 25 and 26, adapted to cooperate with the aforementioned contacts, is connected to the indicator 27 thru conductors 28 and 29.

The switch 24 may be incorporated in the casing with the instrument 29 or it may be located at a point remote from said indicator. This switch is preferably maintained in open position by means, such as a spring, so that the indicator circuit is at all times open since it is unnecessary for a continuous indication, it being sufficient to manually operate the switch when an indication is desired. The switch may also have a pointer cooperating with indicia corresponding to the number of cells of the battery.

When it is desired to test the battery to see if the electrolyte is not below a predetermined level, the switch 24 is turned one step to the right, as viewed in Fig. 1. This movement of the switch brings the arms 25 and 26 thereof into cooperation with the contacts 16 and 20 closing the circuit between the electrodes 9 and 10. If the electrolyte in the cells 1 and 2, in which the electrodes 9 and 10 are placed, is above a predetermined normal level, the indicator needle will deflect from its zero position, thereby indicating that the electrolyte in these cells is above its normal level.

Further rotation of the switch to the right brings the contact arms 25 and 26 of the switch into cooperation with the contacts 19 and 22, thereby closing the circuit across the electrodes 10 and 11 and as before, if the level of the electrolyte in the cells 2 and 3 is above the lower ends of the electrodes 9 and 10, the indicator needle will again deflect thereby indicating that there is sufficient electrolyte in these cells. Further rotation of the switch to the right brings the contact arms 25 and 26 into cooperation with the contacts 17 and 23 thereby closing the circuit across the electrodes 9 and 11 and if the electrolyte in cell 3 is above its normal value, the indicator needle will again deflect thereby indicating that the level of the electrolyte is above its predetermined low level. If provided with a spring, upon release of the switch 24, it will be moved to its normal open position illustrated in Fig. 1.

From the foregoing, it will be seen that by this arrangement, the level of the electrolyte in the individual cells of the battery may be tested and, as before, if this level is above the predetermined low point, beyond which it is undesirable to operate the battery, because of damage thereto by virtue of such low level, the indicator will give an indication of such condition. However, if the electrolyte is low in one of the cells, for example, cell 1, when the switch is first shifted the indicator needle will not deflect because the circuit through the electrolyte is broken on account of non-contact with the electrode 9.

From this indication alone, it will not be possible to determine which of the cells 1 or 2 requires the addition of electrolyte, however, if upon shifting of the switch to its second position the indicator operates, it will indicate that cell 1 requires attention. If instead of indicating when the switch is shifted to its second position there is no indication, it will still be doubtful as to which of the cells 2 or 3 the electrolyte is below its predetermined low point. However, if upon shifting of the switch to its third position and closing the circuit across the electrodes 9 and 11 there is an indication, this would indicate that the electrolyte of the cell 2 is below its predetermined low value and, therefore, requires refilling. In other words, the indicator operates across at least two cells at a time and by the arrangement disclosed in Fig. 1, it is possible to ascertain which of the cells is deficient in electrolyte by a process of elimination.

The voltage between the electrodes 9 and 10 is approximately six-tenths of a volt and the voltage across electrodes 10 and 11 is substantially the same, while the voltage across the electrodes 9 and 11 is approximately one and a half volts. This voltage, of course, depends upon the state of the charge of the battery, the individual cells, and the conditions under which it is operating. According to these voltages, the indicator needle, when connected across electrodes 9 and 10, will deflect a certain distance and will deflect substantially the same distance upon connection across the electrodes 10 and 11, while the deflection will be greater when the instrument is connected across the electrodes 9 and 11.

The indicator 27 may be either of the direct or alternating current type, preferably a milliammeter, designed to operate on very small current. In the use of the direct current type of indicator, it will be necessary, however, to have the indicator properly connected so that the polarity of the pairs of the electrodes will be in the same direction. This precaution, however, is not necessary in the alternating current type of instrument which preferably, though not necessarily, has the zero position of the needle at the midpoint of the scale. If the zero is at the midpoint, one polarity would cause the needle to deflect in one direction while the opposite polarity would cause the needle to deflect in the opposite direction from its midposition. Instead of an indicator a light may be used to indicate, by illumination thereof, when the electrolyte is above its predetermined value. The light, however, being made to conform to the voltages of the circuit operates in a satisfactory manner.

The term "indicator" must be considered wherever used herein as a broad, comprehensive term intended to include any responsive element which may be operated by the current across the electrodes.

Figure 2:
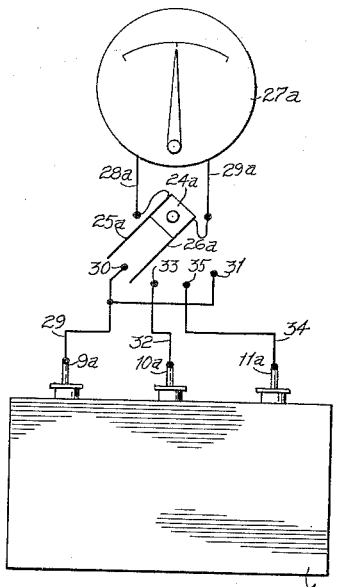
Fig. 2 is a side elevation of a battery with a modified form of the invention applied thereto.

In the modification illustrated in Fig. 2, the parts are numbered the same as those in Fig. 1, but have the exponent "a" added thereto. In this arrangement, the conductor 29 connected to the electrode 9ª branches into two branches which terminate in switch contacts 30 and 31. The conductor 32 connected to the electrode 10ª terminates in the switch contact 33 and likewise the conductor 34 connected with the electrode 11ª terminates in a switch contact 35. The indicator 27ª is connected by conductors 28ª and 29ª to the switch 24ª provided with contact arms 25ª and 26ª. When it is desired to test the battery the switch is turned to the right as viewed in Fig. 2, thereby closing the circuit across the contacts 30 and 33 and if the electrolyte in the cells with which these electrodes are connected is above its predetermined value, the indicator needle will deflect. Further rotation of the switch closes the circuit across the contacts 33 and 35 and if the level of the electrolyte in the cells with which these contacts are associated is above its predetermined value, there will be an indication by the needle.

Further rotation of the switch closes the circuit across the contacts 35 and 31 which are connected by their respective conductors to the electrodes 9ª and 11ª and if the level of the electrolyte is above its predetermined point in these cells, an indication will also be given by the index. If, however, there is no indication across any two of the switch contacts the particular cell in which the electrolyte is below its electrode may be ascertained by a process of elimination as fully described in connection with Fig. 1.

Figure 3:
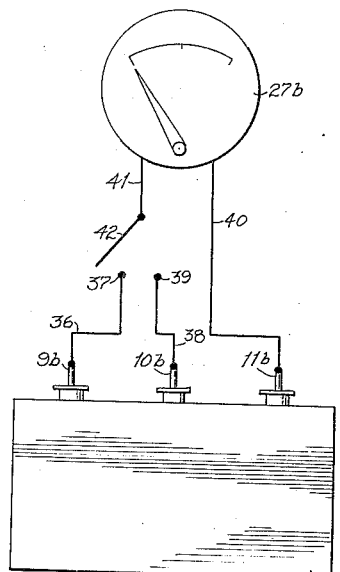
Fig. 3 is a view similar to Fig. 2 showing a modification of the invention.

In the modification shown in Fig. 3 the parts thereof corresponding to like parts in Fig. 1 are indicated by the same numerals as those of Fig. 1

1, but have the exponent "b" added thereto. In this illustration, the conductor 36 connected with the electrode 9$^b$ terminates in a switch contact 37, while the conductor 38 connected with the electrode 10$^b$ terminates in a switch contact 39. The conductor 40 connected to the electrode 11$^b$ is connected direct to one of the binding posts of the indicator 27$^b$, while the other side of the indicator is connected thru a conductor 41 with the single pole switch 42, which is normally in open position. When it is desired to test the condition of the cells the switch 42 is closed with contact 37 thereby closing the circuit between the electrodes 9$^b$ and 11$^b$ and if the electrolyte in the cells with which these electrodes are associated is above its normal level, the needle will deflect. However, if the electrode is below its normal level in either of these cells, there will be no indication. If upon closing the switch with contact 39 there is an indication, this would indicate that the level of the electrolyte with which electrode 9$^b$ is associated is below its normal value. However, if there is an indication upon closure of the switch with both contacts 37 and 39, this would indicate that the level of the electrolyte in all of the cells is above its normal level. In this modification, there are only two indications as distinguished from the three indications of Figs. 1 and 2.

Figure 4:
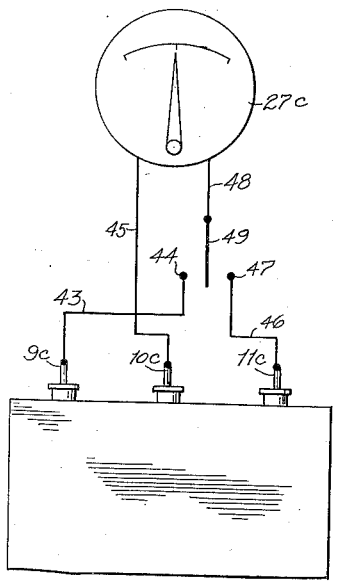
Fig. 4 shows a modification of the invention illustrated in Fig. 3.

The modification of the invention illustrated in Fig. 4 is a slight rearrangement of the wiring of Fig. 3 and the parts in this figure, similar to those of Fig. 1, are indicated by like numerals but have the exponent "c" added thereto. In this modification, the conductor 43 connected with the electrode 9$^c$ terminates in the switch contact 44 and the conductor 46 connected with the electrode 11$^c$ terminates in the switch contact 47. In this illustration, the electrode 10$^c$ is connected by means of the conductor 45 with one side of the indicator 27$^c$, while the other side of the indicator is connected thru a conductor 48 with the single pole switch 49 normally in open position. To test the battery, the switch 48 is turned to the left into contact with the contact 44 thus closing the circuit across electrodes 9$^c$ and 10$^c$ and if the electrolyte in the cells with which these electrodes are associated is above its predetermined value, the indicator will deflect to one side of its center position. When the switch is turned to the right to connect with the contact 47 thereby closing the circuit across electrodes 10$^c$ and 11$^c$, if the electrolyte in the cells 2 and 3 is above its normal value, the needle of the indicator 27$^c$ will deflect in the opposite direction from its first indication. This illustration, like Fig. 3, gives only two indications providing the electrolyte in all of the cells is above its normal value. If in connecting the instrument across the electrodes 9$^c$ and 10$^c$ there was no indication, but upon connection of the indicator across the electrodes 10$^c$ and 11$^c$ there was an indication, this would indicate that the electrolyte in cell 1 is below the end of the electrode 9$^c$, while if there was no indication when the instrument is connected across the electrodes 10$^c$ and 11$^c$ but an indication across electrodes 9$^c$ and 10$^c$, this would indicate that the electrolyte in cell 3 was below its normal value and if there were no indications when the switch is connected with both the contacts 44 and 47, this would indicate that the electrolyte in cell 2, or possibly others, was below its normal level.

Figure 5:
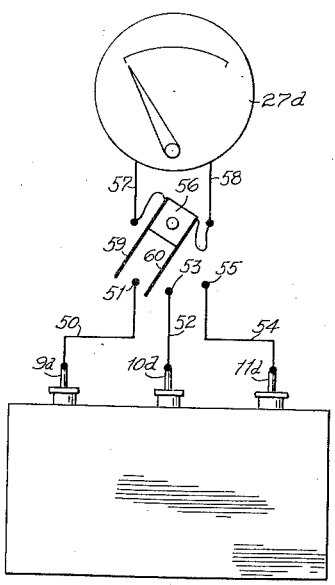
Fig. 5 is a side elevation of a storage battery with a modified form of the invention applied thereto.

In the modification illustrated in Fig. 5, the parts are numbered the same as in Fig. 1 except that the exponent "d" is added thereto. In this illustration, the conductor 50 connected with the electrode 9$^d$ terminates in the switch contact 51, the conductor 52 connected with the electrode 10$^d$ terminates in the switch contact 53 and the conductor 54 connected with the electrode 11$^d$ terminates in the switch contact 55. The indicator 27$^d$ is connected to the double pole switch 56 thru conductors 57 and 58 and the switch is provided with contact arms 59 and 60 adapted to cooperate with the previously mentioned switch contacts when turned or rotated to the right, as viewed in Fig. 5. Upon rotation of the switch to the right into contact with the switch contacts 51 and 53, the instrument is connected across the electrodes 9$^d$ and 10$^d$ and if the electrolyte in the cells with which these electrodes are associated is above its normal level, the index will be deflected from its normal position. However, if the electrolyte is below either of the electrodes, there will be no indication. Upon rotation of the switch into contact with the switch contacts 53 and 55, the instrument 27$^d$ will be connected across the electrodes 10$^d$ and 11$^d$ and if the electrolyte in the cells with which these electrodes are associated is above the normal level, there will be a deflection of the needle. However, if the electrolyte in either of these cells is below the end of the electrodes, there will be no deflection of the needle.

Figure 6:
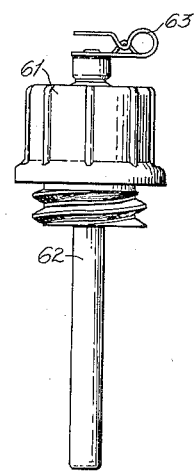
Fig. 6 is a side elevation of the contact device, filler opening cap and connector terminal clip.

In Fig. 6 the electrode is illustrated embodied in the filler cap closure and comprises preferably a carbon contact member 62 secured in and extending thru the usual filler cap 61. This filler cap is usually provided with an air vent for the escape of gases from the various cells and it is to be understood that this usual vent opening is retained in the filler cap to provide for the escape of the gases arising from the cells. As illustrated, the contact member 62 extends thru the cap and is provided, on its exterior end, with a spring clip 63 to facilitate the connection of the conductors with the electrode. While this spring clip provides a convenient way of attaching the conductor to the electrode, it is to be understood that other types of connecting means may be utilized for this purpose. While the electrode is preferably made of carbon, it is to be understood that electrodes made of other material may be used, the condition being that the material of the electrode must not react with the electrolyte to set up any secondary action in the battery, which would be detrimental to the functioning of the battery. Carbon is preferable since it is inert and not acted upon in any way by the electrolyte and, therefore, does not introduce any foreign substance into the cell of the battery which reacts with the electrolyte. By placing the auxiliary electrodes in the cells thru the usual filler cap for the cell, the invention may be applied to existing batteries without any material alterations of the same other than the substitution of new filler caps, provided with the electrodes, for the normal caps. Placing of the auxiliary electrodes into the electrolyte is advantageous in that the small currents drawn from the battery do not materially affect the capacity of the battery.

It is to be understood that the invention is not limited by the exact embodiments shown, which are merely by way of illustration and not limitation as various and other forms of the device will, of course, be apparent to those skilled in the art without departure from the spirit of the invention or the scope of the claim.

What is claimed is:

In combination with a battery having more than two cells, an auxiliary electrode disposed in each cell the lower end of which terminates at a predetermined point below the normal level of the electrolyte, an electrical indicator, and switching means to connect said indicator successively across the auxiliary electrode in one end cell and the auxiliary electrode in the cell adjacent thereto, the auxiliary electrode in the said adjacent cell and the auxiliary electrode in the cell in turn adjacent thereto, and then the auxiliary electrode in the last mentioned adjacent cell and the auxiliary electrode of the first mentioned end cell.

SAMUEL C. VAIL.
ARTHUR B. CUNNINGHAM.